United States Patent
Boghossian

(10) Patent No.: US 9,040,622 B2
(45) Date of Patent: May 26, 2015

(54) SOLVENT-BASED PRIMER SOLUTION BASED ON SILYLATED POLYURETHANE (SPUR) CHEMISTRY FOR POLYCARBONATE SUBSTRATES

(75) Inventor: Razmik Boghossian, Porter Ranch, CA (US)

(73) Assignee: PPG Industries Ohio, Inc., Pittsburgh, PA (US)

( * ) Notice: Subject to any disclaimer, the term of this patent is extended or adjusted under 35 U.S.C. 154(b) by 179 days.

(21) Appl. No.: 13/463,535

(22) Filed: May 3, 2012

(65) Prior Publication Data

US 2013/0296489 A1  Nov. 7, 2013

(51) Int. Cl.
| | |
|---|---|
| *C08G 18/08* | (2006.01) |
| *C08K 5/05* | (2006.01) |
| *C08G 18/78* | (2006.01) |
| *C09D 175/12* | (2006.01) |
| *C08K 5/101* | (2006.01) |
| *C08G 18/75* | (2006.01) |
| *C08G 18/44* | (2006.01) |
| *C09J 175/04* | (2006.01) |

(52) U.S. Cl.
CPC ............... *C08K 5/05* (2013.01); *C08G 18/7843* (2013.01); *C09D 175/12* (2013.01); *C08K 5/101* (2013.01); *C08G 18/755* (2013.01); *C08G 18/44* (2013.01); *C09J 175/04* (2013.01)

(58) Field of Classification Search
CPC ............... C09D 175/00; C09D 175/12; C08G 18/0847; C08G 18/2865; C08G 18/289; C08G 18/44; C08G 18/61
USPC .......... 524/589, 590, 839, 871, 873, 874, 875
See application file for complete search history.

(56) References Cited

U.S. PATENT DOCUMENTS

| | | | | |
|---|---|---|---|---|
| 3,632,557 | A | * | 1/1972 | Brode et al. ............... 528/28 |
| 4,345,053 | A | | 8/1982 | Rizk et al. |
| 4,374,237 | A | | 2/1983 | Berger et al. |
| 4,429,082 | A | | 1/1984 | Lee et al. |
| 4,430,486 | A | | 2/1984 | Chang et al. |
| 4,567,228 | A | | 1/1986 | Gaa et al. |
| 4,582,873 | A | | 4/1986 | Gaa et al. |
| 4,960,844 | A | | 10/1990 | Singh |
| 5,147,927 | A | | 9/1992 | Baghdachi et al. |
| 5,223,575 | A | * | 6/1993 | Mori et al. ............... 525/102 |
| 5,227,434 | A | | 7/1993 | Katz |
| 5,272,224 | A | * | 12/1993 | Baghdachi et al. ........ 525/460 |
| 5,298,572 | A | | 3/1994 | Katz |
| 5,354,880 | A | | 10/1994 | Pepe et al. |
| 6,048,579 | A | | 4/2000 | Wang et al. |
| 6,197,912 | B1 | | 3/2001 | Huang et al. |
| 6,440,573 | B1 | | 8/2002 | Hansen et al. |
| 7,417,105 | B2 | | 8/2008 | Landon et al. |
| 7,482,420 | B2 | | 1/2009 | Porsch et al. |
| 7,683,196 | B2 | * | 3/2010 | Teysseire .................. 556/400 |
| 7,812,087 | B2 | | 10/2010 | Ludewig et al. |
| 8,101,681 | B2 | | 1/2012 | Kohl et al. |
| 2008/0236725 | A1 | * | 10/2008 | Mahdi et al. .............. 156/108 |
| 2012/0019888 | A1 | * | 1/2012 | Mori et al. ............... 359/241 |

FOREIGN PATENT DOCUMENTS

| | | |
|---|---|---|
| EP | 0 082 528 B1 | 6/1983 |
| EP | 0 770 633 A2 | 5/1997 |
| WO | WO 2010119755 A1 * | 10/2010 |

* cited by examiner

*Primary Examiner* — Michael L Leonard
(74) *Attorney, Agent, or Firm* — Christie, Parker & Hale, LLP

(57) ABSTRACT

A primer solution for enhanced adhesion to a rigid substrate for aviation and aerospace applications includes an aminosilane-capped polyurethane prepolymer and a first solvent. The first solvent reacts with or modifies the surface of the rigid substrate, enabling the primer solution including the aminosilane-capped polyurethane prepolymer to become a part of the surface of the rigid substrate.

35 Claims, No Drawings

SOLVENT-BASED PRIMER SOLUTION BASED ON SILYLATED POLYURETHANE (SPUR) CHEMISTRY FOR POLYCARBONATE SUBSTRATES

FIELD OF THE INVENTION

The invention is directed to solvent-based, UV stable primer solution based on silylated polyurethane chemistry for polycarbonate and glass substrates.

BACKGROUND OF THE INVENTION

Windows, including windshields and canopies, in aviation and aerospace vehicles are often made of interlayers and rigid substrates, such as polycarbonates, glass, acrylics, and combinations thereof. These windshields and canopies should

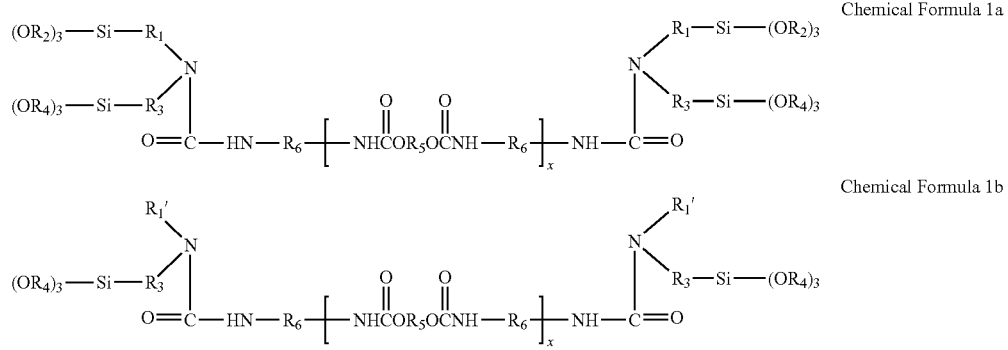

maintain long-term optical clarity and structural strength. To that end, primers have been used to increase adhesion between these different layers of windshields and canopies. Traditional primers generally include monomeric siloxane and amino silane based primers.

These traditional primers improve adhesion between different layers of windshield (rigid and flexible parts), but the primer solution may suffer from instability problems. In particular, a traditional primer solution may increase in viscosity, form sediments, or separate over time. This is especially true for concentrated primer stock solutions, which must sometimes even require refrigerated storage or storage under nitrogen. Even under optimal storage conditions, traditional primer stock solutions have a shelf life ranging from a day to a month. Diluting the primer stock solution to lower concentrations may increase the shelf life to up to six months, but this also increases the volume of solution that must be stored.

Moreover, the adhesion strength provided by traditional primers, as measured in pounds per linear inch ("pli") during a peel strength test, is less than optimal. If the adhesion provided by the primer is insufficiently strong, the layers of the windshields and/or canopies may separate, resulting in delamination. This is a serious safety concern for a pressurized aircraft, as delamination can lead to compromised visibility, chipping, cracks, and window failure.

SUMMARY OF THE INVENTION

The present invention provides a solvent-based silylated polyurethane (SPUR) primer solution having improved performance characteristics compared to traditional primers. In one embodiment, the primer solution includes a silylated polyurethane prepolymer and a first solvent (hereinafter referring to a non OH-containing solvent that is used in a first step of a reaction) that can activate or modify the surface of the rigid polymeric substrate, in one embodiment the surface of the polycarbonate to which it is applied. In one embodiment, the silylated polyurethane prepolymer is prepared by reacting an amino silane with an isocyanate-terminated polyurethane prepolymer to form an aminosilane-capped polyurethane prepolymer.

The solvent-based solution according to the present invention exhibits adhesion performance characteristics that are improved compared to those of previous primers. In addition, the solvent-based primer solution exhibits a longer shelf life and better stability.

According to one aspect of the invention, a primer solution for use on a rigid substrate includes an aminosilane-capped polyurethane prepolymer represented by Chemical Formula 1a or Chemical Formula 1b wherein $R_1$, $R_1'$, $R_2$, $R_3$ and $R_4$ are independently selected from aliphatic hydrocarbons, $R_5$ is a polyhydroxy linkage, $R_6$ is a hydrocarbon group, and x is an integer between 1 and 5; and a first solvent (a non OH-containing solvent from a first reaction step) capable of activating or modifying a surface of the rigid polymeric substrate.

In one embodiment of the invention, the aminosilane-capped polyurethane prepolymer comprises a reaction product of an isocyanate-terminated polyurethane prepolymer represented by Chemical Formula 2 and an aminosilane represented by Chemical Formula 5a or Chemical Formula 5b.

Chemical Formula 2

In Chemical Formula 2, $R_5$ is a polyhydroxy linkage, $R_6$ is an aliphatic or cycloaliphatic hydrocarbon group, and x is an integer between 1 and 5.

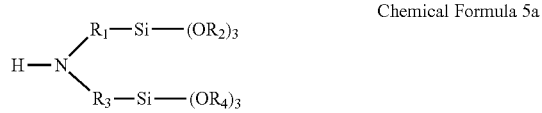

Chemical Formula 5a

Chemical Formula 5b

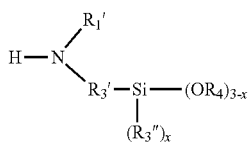

In Chemical Formulas 5a and 5b, $R_1$, $R_1'$, $R_2$, $R_3$, $R_3'$, $R_3''$ and $R_4$ are independently selected from aliphatic hydrocarbons.

In one embodiment of the invention, the isocyanate-terminated polyurethane prepolymer comprises a reaction product of a polyol represented by Chemical Formula 3 and an isocyanate represented by Chemical Formula 4.

$(HO)_a R_5$     Chemical Formula 3

In Chemical Formula 3, $R_5$ is a polyhydroxy linkage, and a is 1 or 2. A large number of higher molecular weight polyhydroxy linkages can be used as polyols in this process.

Chemical Formula 1a

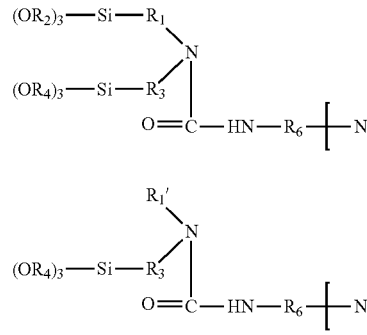

Chemical Formula 1b $R_6$—$(N{=}C{=}O)_b$     Chemical Formula 4

In Chemical Formula 4, $R_6$ is selected from aliphatic and cycloaliphatic groups, and b is 1 or 2.

In one embodiment of the invention, the primer solution further includes a second solvent (hereinafter referring to a solvent and/or solvent combination added to the reaction after capping or terminating an isocyanate prepolymer with amino silanes for further dilution of the first solvent).

In one embodiment, the primer solution includes the first solvent in an amount between about 0.1 and about 2.5% by weight based on the total weight of the primer solution. In one embodiment, the first solvent is present in an amount between about 1.2 and about 1.8% by weight based on the total weight of the primer solution.

In one embodiment, the first solvent includes toluene, xylene, acetone, methyl ethyl ketone, tert-butyl acetate and n-butyl acetate.

In one embodiment, the primer solution includes a low molecular weight alcohol. In one embodiment, the low molecular weight alcohol is methanol, ethanol, isopropyl alcohol or any combinations thereof.

In one embodiment, the isocyanate is an aliphatic or cycloaliphatic diisocyanate. In one embodiment, the aliphatic diisocyanate is isophorone diisocyanate ("IPDI").

In one embodiment, the polyol includes a polycarbonate diol.

In one embodiment, the aminosilane has only one hydrogen on the N atom of the amino group. In one embodiment, the aminosilane includes bis-(gamma-Trimethoxysilylpropyl)amine, Bis(methyldiethoxysilylpropyl) amine or a combination thereof.

In one embodiment, the primer solution includes a catalyst. In one embodiment, the catalyst is dibutyl tin diacetate, dibutyl tin dioctate, dibutyl tin dilaurate, or combinations thereof.

According to one aspect of the invention, a method of preparing a primer solution for use on a rigid polymeric substrate, includes mixing a polyol represented by Chemical Formula 3 with a first solvent capable of activating or modifying a surface of the rigid polymeric substrate; reacting an isocyanate represented by Chemical Formula 4 and the polyol to produce an isocyanate-terminated polyurethane prepolymer represented by Chemical Formula 2; and adding an aminosilane represented by Chemical Formula 5a or Chemical Formula 5b to the isocyanate-terminated polyurethane prepolymer to produce an aminosilane-capped polyurethane prepolymer represented by Chemical Formula 1a or Chemical Formula 1b.

In Chemical Formulas 1a and 1b, $R_1$, $R_1'$, $R_2$, $R_3$ and $R_4$ are independently selected from aliphatic hydrocarbons, $R_5$ is a polyhydroxy (polyol) linkage, $R_6$ is an aliphatic or cycloaliphatic hydrocarbon group, and x is an integer between 1 and 5.

Chemical Formula 2

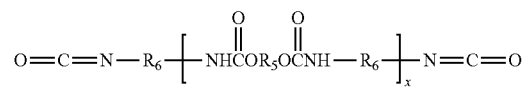

In Chemical Formula 2, $R_5$ is a polyhydroxy linkage, $R_6$ is based on an aliphatic or cycloaliphatic hydrocarbon group, and x is an integer between 1 and 5.

$(HO)_a R_5$     Chemical Formula 3

In Chemical Formula 3, $R_5$ is a polyhydroxy linkage, and a is 1 or 2.

$R_6$—$(N{=}C{=}O)_b$     Chemical Formula 4

In Chemical Formula 4, $R_6$ is an aliphatic hydrocarbon, and b is 1 or 2.

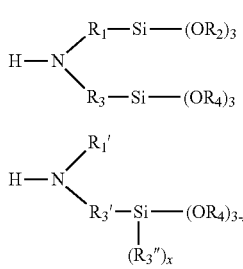

Chemical Formula 5a

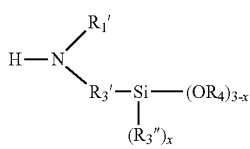

Chemical Formula 5b

In Chemical Formulas 5a and 5b, $R_1$, $R_1'$, $R_2$, $R_3$, $R_3'$, $R_3''$ and $R_4$ are independently selected from aliphatic hydrocarbons.

In one embodiment, the method includes adding a second solvent to the aminosilane-capped polyurethane prepolymer.

In one embodiment, the first solvent is added in an amount of about 0.1 to about 2.5% by weight based on the total weight of the primer solution. In one embodiment, the first solvent is added in an amount of about 1.2 to about 1.8% by weight based on the total weight of the primer solution.

In one embodiment, the first solvent includes n-butyl acetate.

In one embodiment, the method includes adding a low molecular weight alcohol to the aminosilane-capped polyurethane prepolymer.

In one embodiment, the isocyanate includes an aliphatic or cycloaliphatic diisocyanate or a combination of aliphatic or cycloaliphatic diisocyanates. In one embodiment, the aliphatic diisocyanate includes isophorone diisocyanate ("IPDI").

In one embodiment, the polyol includes a polycarbonate diol.

In one embodiment, the aminosilane has only one hydrogen on the amino group. In one embodiment, the aminosilane includes bis-(gamma-Trimethoxysilylpropyl)amine, Bis(m-ethyldiethoxysilylpropyl) amine or a combination thereof.

In one embodiment, the method includes adding a catalyst to the isocyanate and polyol to catalyze the reaction. In one embodiment, the catalyst is dibutyl tin diacetate, dibutyl tin dioctate, dibutyl tin dilaurate or combinations thereof.

In one embodiment, the method includes monitoring the value of —N=C=O during the reaction of the polyol and the isocyanate to ensure formation of an isocyanate-terminated polyurethane prepolymer. In one embodiment, the value of —N=C=O is monitored using a back titration method.

DETAILED DESCRIPTION OF THE INVENTION

Solvent-based primer solutions useful for aerospace and aviation applications are provided. The primer solutions exhibit improved stability and performance over traditional primers. In one embodiment, a primer solution includes an aminosilane-capped polyurethane prepolymer and a first solvent that can activate or modify the surface of a rigid substrate, for example a polymer or glass substrate, onto which it can be applied. The primer solution may also include a second solvent, a low molecular weight alcohol and a third solvent (hereinafter referring to a high boiling point OH-containing or non OH-containing solvent or combination of solvents that is considered as a suitable leveling and/or wetting agent).

Surface activation and/or modification of the rigid polymeric substrate by the first solvent in the primer solution may be referred to as a "room temperature melt process." As used herein, "room temperature melt process" refers to a process in which a solvent activates or modifies the surface of a rigid substrate. In particular, in certain embodiments, the aminosilane-capped polyurethane prepolymer undergoes a sol-gel reaction on the activated or modified surface of the rigid polymeric substrate to become part of the surface of the substrate.

The first solvent should be capable of activating or modifying the rigid polymeric or glass substrate to which the primer solution can be applied. In one exemplary embodiment, a first solvent having no —OH functional groups can be used. The first solvent may be a single solvent or a combination of solvents. In one embodiment, the first solvent comprises toluene, xylene, acetone, methyl ethyl ketone, tert-butyl acetate, n-butyl acetate or a combination thereof.

The low molecular weight alcohol such as a lower alkyl alcohol may be added to the primer to prevent or inhibit the aminosilane-capped polyurethane prepolymer from undergoing further hydrolysis, condensation reactions and cross-linking. The lower alkyl alcohol may be a single alcohol or a combination of alcohols. The molecular weight range for low molecular weight alcohols can be between 30 and 100 or between 30 and 80. Nonlimiting examples of the lower alkyl alcohol include methanol, ethanol, isopropyl alcohol and combinations thereof. In one embodiment, the amount of low molecular weight alcohol added can be about 0.1% to about 5% by weight based on 100 parts by weight of the aminosilane-capped polyurethane prepolymer. In an exemplary embodiment, the amount of low molecular weight alcohol added can be about 0.5% to about 4% by weight based on 100 parts by weight of the aminosilane-capped polyurethane prepolymer. In one exemplary embodiment, the amount of low molecular weight alcohol added can be about 1% to about 3% by weight based on 100 parts by weight of the aminosilane-capped polyurethane prepolymer. The low molecular weight alcohol can be added slowly to prevent any polymer shocking and/or precipitation. After addition of the low molecular weight alcohol is completed, the solution can be mixed. The mixing may be for about 2 to 3 minutes.

The second solvent may be added to dilute the first solvent. The second solvent may be a single solvent or a combination of solvents. In an exemplary embodiment, the second solvent can be one that does not react with or modify the surface of the rigid substrate onto which it can be applied, and/or does not react with any of the other components of the primer solution. In one embodiment, the second solvent comprises generally a solvent with a boiling point of greater than 100° C. The solvent could be a hydroxyl-containing or non-hydroxyl-containing solvent. A hydroxyl-containing solvent may have one or more hydroxyl groups. Any non-hydroxyl-containing solvent with acceptable wetting and good leveling properties can be acceptable and used as a second solvent. In one embodiment, the second solvent can be diacetone alcohol ("DAA"). In one embodiment, the amount of second solvent added can be about 20% to about 100% by weight based on 100 parts by weight of the aminosilane-capped polyurethane prepolymer. In an exemplary embodiment, the amount of second solvent added can be about 40% to about 98% by weight based on 100 parts by weight of the aminosilane-capped polyurethane prepolymer. In one exemplary embodiment, the amount of second solvent added can be about 60% to about 95% by weight based on 100 parts by weight of the aminosilane-capped polyurethane prepolymer. The second solvent can be added quickly. After addition of the second solvent, the solution can be mixed. In one embodiment, the solution can be mixed for about 5 to 10 minutes.

The solution containing the aminosilane-capped polyurethane prepolymer, the first solvent, the second solvent, and optionally the low molecular weight alcohol can be referred to as a primer stock solution. The primer stock solution can be shelf stable and can remain stable without requiring storage under nitrogen or other special conditions.

To prepare an applied primer solution from the primer stock solution, an amount of primer stock solution can be diluted with a third solvent. The third solvent may be a single solvent or a combination of solvents. As used herein, the primer stock solution comprises a concentrated polymer solution not intended to be applied to the rigid polymeric substrate. Instead, the primer stock solution may be diluted further with at least one third solvent to produce an applied primer solution, which is intended to be applied to the rigid polymeric substrate. The applied primer solution may be used, for example, in aerospace and aviation applications, and may also be referred to interchangeably herein as "primer" or "primer solution."

Suitable candidates for the third solvent include solvents that are at least miscible with the first and second solvents, have high boiling points, and are substantially non-reactive with all of the components of the primer stock solution. Suitable third solvents may also be colorless, odorless, and substantially nontoxic. Suitable third solvents include diacetone alcohol, propylene glycol n-butyl ether, dipropylene glycol methyl ether, propylene glycol methyl ether, tripropylene glycol methyl ether, tripropylene glycol n-butyl ether, tripropylene glycol n-propyl ether, dipropylene glycol methyl ether acetate, dipropylene glycol n-butyl ether, dipropylene glycol n-propyl ether, propylene glycol diacetate and other glycol ether type solvents. In one embodiment, the third solvent comprises diacetone alcohol. Diacetone alcohol has a high boiling point, and good leveling and wetting characteristics, making it a particularly good candidate for the third solvent.

The third solvent can be added to dilute the final concentration of the first solvent in the primer stock solution to about 0.5% to about 5% by weight to form the applied primer solution. In an embodiment, the final concentration of the first solvent can be about 0.8% to about 3% by weight of the applied primer solution. In one exemplary embodiment, the final concentration of the first solvent can be about 1% to about 2% by weight of the applied primer solution. In one exemplary embodiment, the final concentration of the first solvent can be about 1.2% to about 1.8% by weight of the applied primer solution. Dilution of the primer stock solution to include a lower amount of the first solvent in the applied primer solution serves to prevent excessive activation of the surface of the rigid polymeric substrate by the first solvent. In particular, if the concentration of the first solvent in the applied primer solution is too high, the first solvent will over activate the surface of the rigid substrate and cause hazing of the rigid substrate. If the concentration of the first solvent is too low, the rigid polymeric substrate will not be activated.

After adding the third solvent, the applied primer solution can be stirred. In one embodiment, the applied primer solution can be stirred for a few minutes. At this point, the applied primer solution can be stable under normal conditions and does not require storage under nitrogen.

In one embodiment, the applied primer solution also includes a low molecular weight alcohol such as methanol, ethanol, isopropyl alcohol or a combination thereof. The low molecular weight alcohol may be a single alcohol or a combination of alcohols. The low molecular weight alcohol may be added in order to stabilize the primer solution. In one embodiment, a ratio of the low molecular weight alcohol to the third solvent can be about 10 to 90. In one embodiment, the ratio of low molecular weight alcohol to the third solvent can be about 5 to 95. In one exemplary embodiment, the ratio of low molecular weight alcohol to the third solvent can be about 2 to 98. In one embodiment, about 100% by weight low molecular weight alcohol may be included in the applied primer solution, based on the total weight of the primer stock solution. The low molecular weight alcohol may be added during the dilution of the primer stock solution with the third solvent.

The applied primer solution can be suitable for application to substrates that are capable of being reacted with or modified by the first solvent. Nonlimiting examples of suitable substrates include polycarbonates and other polymeric substrates. Although the applied primer solution could be used with other substrates, e.g. acrylic, the applied primer solution may not yield results with these substrates that are as dramatic as those achieved with more suitable substrates, e.g., polycarbonates.

After dilution of the primer stock solution to form the applied primer solution, the applied primer solution may be applied to the rigid polymeric substrate by any suitable method, including but not limited to spraying, flow coating or a wipe-on-wipe-off technique.

While spraying and flow coating can be an available method, an advantage of the primer solution according to embodiments of the present invention is the ability to coat the substrate using less of the primer solution. Indeed, in the case of spraying with a spray gun or by flow coating using a squeeze bottle or a spray bottle, application of the applied primer solution to the rigid polymeric substrate results in large amounts of wasted primer solution from these operations.

In contrast, using the wipe-on-wipe-off-technique, the applied primer solution can be applied indirectly to the rigid substrate by a rag dampened with the applied primer solution. The applied primer solution can be then wiped off with a dry rag. Nonlimiting examples of the rag include a rymple cloth or any non-lint cloth. As this method enables the use of a smaller amount of the applied primer solution, the technique results in substantially less waste.

After application of the applied primer solution to the surface of the rigid substrate, the applied primer solution can be allowed to dry. In one embodiment, the applied primer solution can be allowed to dry for 20 to 30 minutes at room temperature in a dust-free environment. As the applied primer solution dries, the low molecular weight alcohol (e.g., methanol, ethanol, and/or isopropyl alcohol) evaporates before the diacetone alcohol ("DAA"), which allows the hydrolysis and self-condensation of the silylated polyurethane to proceed. The alkoxy groups on the silylated polyurethane polymer hydrolyze and continue to undergo a typical condensation/cross-linking mechanism on the surface of the substrate.

During the application of the applied primer solution, the unique solvent combination activates the surface of the substrate in a "room temperature melt process." This allows the primer to adhere physically to the surface of the rigid substrate. In one embodiment, the silylated polyurethane cross-linked system becomes a part of the surface of the substrate. In the case of a polycarbonate substrate, the silylated polyurethane cross-linked system becomes a part of the polymeric substrate.

After the primer solution is permitted ample time to dry and cure, a second flexible substrate such as an interlayer, for example a thermoplastic polymer sheet, can be applied to the rigid substrate and heat laminated under specific conditions. In one embodiment, the drying time can be about 20 to 30 minutes. The resulting 90° peel adhesion of the laminates exhibit improved peel strength compared to traditional primers due to the relaxed thermodynamic state of the cross-linked system.

The aminosilane-capped polyurethane prepolymer may be represented by Chemical Formula 1a or Chemical Formula 1b.

and the like, and mixture thereof. These monomeric diisocyanates are reacted with low molecular weight diols in a first reaction step to give high molecular weight diisocyanates. The reaction and the stoichiometric ratio of monomeric diisocyanate to diol should be in the range of about 4:1 or 3:1. In an exemplary embodiment, the stoichiometric ratio is in the

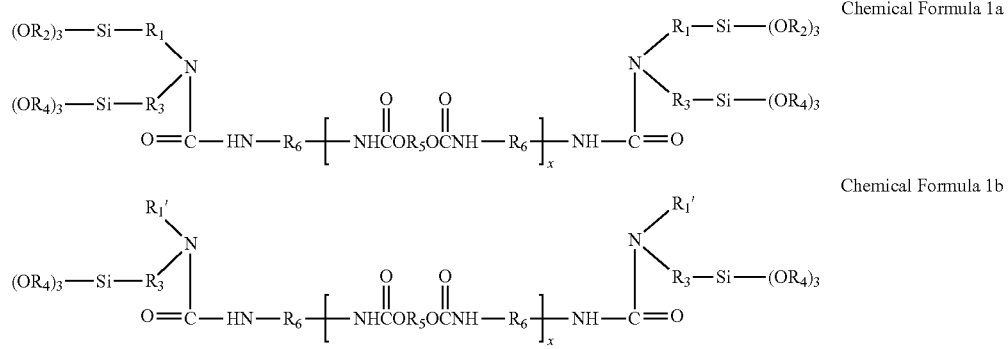

Chemical Formula 1a

Chemical Formula 1b

In Chemical Formulas 1a and 1b, $R_1$, $R_1'$, $R_2$, $R_3$ and $R_4$ are independently selected from aliphatic hydrocarbons, $R_5$ is a polyhydroxy linkage, $R_6$ is an aliphatic or cycloaliphatic hydrocarbon group, and x is an integer from 1 to 5. In an exemplary embodiment, x is an integer from 1 to 3. Polymerization number x is controlled by different —N═C═O to —OH ratios. In one embodiment, $R_1$, $R_1'$, $R_2$, $R_3$ and $R_4$ are independently selected from lower alkyls such as methyl, ethyl, propyl, isopropyl, butyl and pentyl groups.

In one embodiment, $R_1$ and $R_3$ are each propyl groups. In one embodiment, $R_1'$, $R_2$ and $R_4$ are each methyl groups. Examples of aminosilanes for use in the silylation procedure herein are 3-aminopropyltrimethoxysilane, 3-aminopropyltriethoxysilane, 4-amino-3,3-dimethylbutyltrimethoxysilane, 4-amino-3,3-dimethylbutyl-dimethoxymethylsilane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropylmethyldimethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethylbutyldimethoxy-methylsilane, N-ethyl-4-amino-3,3-dimethylbutyltrimethoxysilane, bis-(3,3-trimethoxysilyl) propylamine and mercaptan-containing silanes such as 3-mercaptopropyltrimethoxy silane.

In one embodiment, $R_6$ comprises an isophorone group. Examples for isocyanates including $R_6$ include monomeric diisocyanates that are those aliphatic and/or cycloaliphatic diisocyanates having a molecular weight of less than about 500. Examples of suitable aliphatic diisocyanates are tetramethoxybutane 1,4-diisocyanate, butane 1,4-diisocyanate, hexane 1,6-diisocyanate (HDI), 1,6-diisocyanato-2,2,4-trimethylhexane, lysine diisocyanate and 1,12-dodecane diisocyanate ($C_{12}$DI). Example of suitable cycloaliphatic diisocyanates are the hydrogenation products of the aromatic diisocyanates, such as e.g. 4,4'-dicyclohexylmethane diisocyanate ($H_{12}$MDI), 1-isocyanatomethyl-3-isocyanato-1,5,5-trimethylcyclohexane (isophorone diisocyanate, IPDI), cyclohexane 1,4-diisocyanate, hydrogenated xylylene diisocyanate ($H_6$XDI), 1-methyl-2,4-diisocyanatocyclohexane, m- or p-tetramethylxylene (m-TMXDI) and (p-TMXDI) and dimerized fatty acid diisocyanates, Desmodur N® (Bayer)

range of about 2:1. Aliphatic polymeric isocyanates from Bayer Material Science can also be included in this chemistry.

In one embodiment, polyols including $R_5$ are selected from polycarbonates, polyesters, polyethers, alkyds, caprolactones, and acrylic groups. In one embodiment, a polyol including $R_5$ comprises a polycarbonate group. A large number of higher molecular-weight polyhydroxy compounds can be used as polyols in this chemistry. The polyhydroxy compounds with two or three hydroxyl groups per molecule in the molecular weight of 400 to 20000, preferably in the range of 450 to 6000, which are liquid at room temperature, glassy solid/amorphous or crystalline, are suitable polyols. Examples are di- and/or tri-functional polypropylene glycols. Another group of polyethers that can be used are the polytetramethylene glycols, which may produced, for example, by acid polymerization of tetrahydrofuran. The molecular weight range of these polytetramethylene glycols is between about 600 and 6000. In an exemplary embodiment, the molecular weight range of the polytetramethylene glycols is in the range of about 800 to 5000. Another group of polyols that may be used according to the invention are polyesters based on ε-caprolactone, also known as "polycaprolactones". Generally amorphous and/or crystalline polyester polyols also may be used. Other suitable polyols are polycarbonate polyols in the molecular weight range of about 450 to 3000. In an exemplary embodiment, the molecular weight range of the polycarbonate polyols is in the range of about 750 to 2000. Because of this method of production, the hydroxyl groups in these polyols are usually randomly distributed, so that these are either highly linear or slightly branched polyols with an average OH functionality. Although the di-functional compounds are used for the polyols in exemplary embodiments, polyols with higher functionality can also be used, at least in very small quantities.

The aminosilane-capped polyurethane prepolymer can be prepared by capping an isocyanate-terminated polyurethane prepolymer with an aminosilane. A slight undercharging and/or overcharging of aminosilanes may be advantageous. Silane adhesion promoters may be employed at levels of from about 0.1 to about 5 parts per hundred parts of the silylated polyurethane polymer. An exemplary embodiment includes silane adhesion promoters at levels from about 0.5 to about 1.5 parts per hundred parts of the silylated polyurethane polymer. Suitable adhesion promoters include Silquest® A-1120 silane, Silquest® A-2120 silane, Silquest® A-187 silane and other silane containing species from Momentive Performance Materials.

The isocyanate-terminated polyurethane prepolymer can be prepared by reacting an excess of isocyanate with a polyol and continuing the polymerization reaction until an isocyanate-terminated polyurethane prepolymer can be obtained. Specifically, a stoichiometric excess of the isocyanate can be reacted with the polyol to ensure that an isocyanate-terminated polyurethane prepolymer can be obtained. The isocyanate-terminated polyurethane prepolymer may have the general formula represented by Chemical Formula 2:

Chemical Formula 2

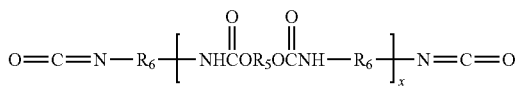

In Chemical Formula 2, $R_5$ is a polyhydroxy linkage, $R_6$ is an aliphatic or cycloaliphatic hydrocarbon group as described above in reference to Chemical Formulas 1a and 1b, and x is an integer from 1 to 5. In an exemplary embodiment, x is an integer from 1 to 3. The polymerization range for x can be controlled by different —N═C═O to —OH ratios. The —N═C═O to —OH ratio may be about 4.0:1.0. In one embodiment, the N═C═O to —OH ratio can be about 3.0:1.0. In an exemplary embodiment, the N═C═O to —OH ratio is about 2.0:1.0.

The polyol used in the reaction to form the polyurethane prepolymer may be any suitable polyol. In one embodiment, the polyol is a compound represented by Chemical Formula 3:

Chemical Formula 3

In Chemical Formula 3, $R_5$ is a polyhydroxy linkage, and a is 2 or more. Nonlimiting examples of suitable polyols include polycarbonates, polyesters, polyethers, alkyds, polyurethanes, caprolactones, acrylic polyols, and polycarbonate polyols. Other suitable polyols are described above in reference to $R_5$ in Chemical Formulas 1a and 1b. In some exemplary embodiments, the polyol comprises a polycarbonate diol.

The isocyanate may be any suitable isocyanate, for example a compound represented by Chemical Formula 4:

Chemical Formula 4

In Chemical Formula 4, $R_6$ comprises an aliphatic or cycloaliphatic hydrocarbon, and b is 2 or more, and the isocyanate comprises an aliphatic isocyanate. Nonlimiting examples of suitable aliphatic isocyanates include isophorone diisocyanate, 1,4-cyclohexane diisocyanate, 4,4'-dicyclohexylmethane diisocyanate, bis(isocyanatomethyl)cyclohexane, tetramethylxylylene diisocyanate ("TMXDI"), 1,6-hexamethylene diisocyanate, and the like. Other suitable diisocyanates are described above in reference to $R_6$ in Chemical Formulas 1a and 1b. In one embodiment, the isocyanate comprises Desmodur W, which has two cyclic rings. In one exemplary embodiment, isophorone diisocyanate ("IPDI") and tetramethylxylylene diisocyanate ("TMXDI") are especially advantageous for use in preparing the polyurethane prepolymers herein.

A stoichiometric excess of the isocyanate can be reacted with the polyol to form an isocyanate-terminated prepolymer. In one embodiment, the ratio of the —N═C═O of the isocyanate to the terminal —OH of the polyol can be between about 1.3 to about 2.3.

The isocyanate-terminated polyurethane prepolymer represented by Chemical Formula 2 may be prepared by reacting the polyol represented by Chemical Formula 3 and the isocyanate represented by Chemical Formula 4 in a reaction represented by Reaction Scheme 1.

Reaction Scheme 1

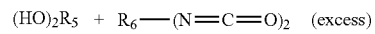

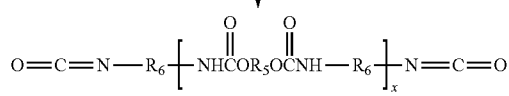

The reaction between the polyol and the isocyanate takes place in a polar first solvent having no —OH functional groups. Suitable solvents for the first solvent include toluene, xylene, acetone, methyl ethyl ketone, tert-butyl acetate, n-butyl acetate and combinations thereof. In one embodiment, the first solvent comprises n-butyl acetate.

The reaction of the polyol with the isocyanate can be catalyzed by any suitable catalyst. In one embodiment, the catalyst comprises a tin catalyst. Nonlimiting examples of tin catalysts include dibutyl tin diacetate, dibutyl tin dioctate, and dibutyl tin dilaurate ("DBTDL").

The progress of the reaction between the isocyanate and the polyol can be determined by back titration. In this type of polyaddition reaction where an excess amount of isocyanate is used with respect to a known polyol, the typical final actual —N═C═O value may be less than the theoretical or calculated —N═C═O value. This indicates that the reaction is complete, yielding a polymer that is terminated with —N═C═O groups.

Once the formation of the isocyanate-terminated polyurethane prepolymer is complete, the actual value of —N═C═O can be determined by known standard titration method, and a stoichiometric amount of aminosilane, calculated based on the actual amount of —N═C═O, can be added to react with the —N═C═O and cap the —N═C═O groups with the aminosilane. In one embodiment, the amount of aminosilane can be about 6% to about 15% by weight based on 100 parts by weight of the polyol and isocyanate. In some exemplary embodiments, the amount of aminosilane can be about 6.5% to about 10.6% by weight, or about 7% to about 10.2% by weight based on 100 parts by weight of the polyol and isocyanate. In an exemplary embodiment, the amount of aminosilane can be about 10% by weight based on 100 parts by weight of the polyol and isocyanate. In one embodiment, a slight excess and/or undercharging, for example about 1 to 2% of aminosilane may be used. The calculated amount of aminosilane can be added slowly to the batch under agitation and nitrogen atmosphere to control the exotherm. After the addition is complete, the batch can be mixed for about 5 to 10 minutes.

The aminosilane-capped polyurethane prepolymer represented by Chemical Formulas 1a or 1b may be prepared by reacting the polyurethane prepolymer represented by Chemical Formula 2 with the aminosilane represented by Chemical Formulas 5a or 5b in a reaction represented by Reaction Scheme 2.

Reaction Scheme 2

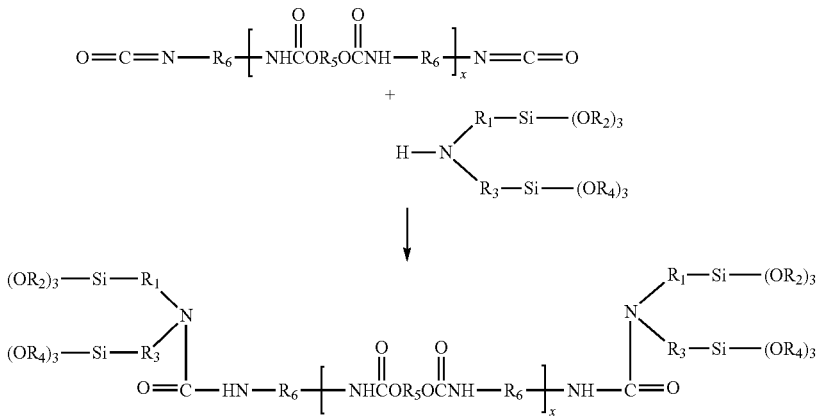

In one embodiment, the aminosilane can be added slowly, and the mixture can be mixed for about 5 to 10 minutes. In one embodiment, the temperature of the mixture can be maintained below about 45° C. Disappearance of the —N=C=O peak due to reaction and capping with the aminosilane can be determined by Fourier Transform Infrared Spectroscopy ("FT-IR").

The aminosilane can be any suitable aminosilane. In some embodiments, for example, the aminosilane includes a single H atom on the nitrogen. This allows the formation of a linear system, substantially eliminating the creation of undesired by-products and/or premature crosslinking (pre-crosslinking). In this exemplary embodiment, the use of an aminosilane including a single H on the nitrogen enables predictability of the end product. For example, the aminosilane may be a compound represented by Chemical Formula 5 or Chemical Formula 5b:

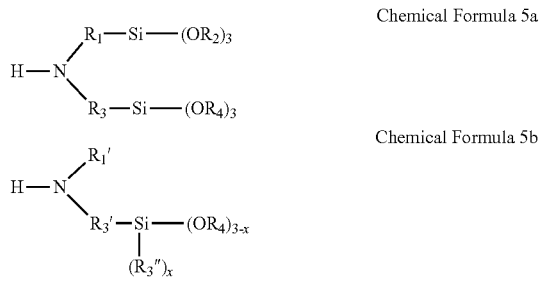

Chemical Formula 5a

Chemical Formula 5b

In Chemical Formulas 5a and 5b, $R_1$, $R_1'$, $R_3$, $R_3'$ and $R_3''$ are independently selected from aliphatic hydrocarbons. $R_2$ and $R_4$ are independently selected from aliphatic hydrocarbons. Nonlimiting examples of aliphatic hydrocarbons include lower alkyls such as methyl, ethyl, propyl, isopropyl, butyl and pentyl groups. In one embodiment, $R_1$ and $R_3$ are each propyl groups. In one embodiment, $R_2$ and $R_4$ are each methyl groups. Nonlimiting examples of aminosilanes include Bis(Triethoxysilylpropyl)amine (HN—[(CH$_2$)$_3$—Si—(OC$_2$H$_5$)$_3$]$_2$ CAS#82985-35-1) and Bis(methyldiethoxysilylpropyl)amine (HN—[(CH$_2$)$_3$—Si—(CH$_3$)—(OC$_2$H$_5$)$_2$]$_2$ CAS#31020-47-0). Hydroxyl-containing silanes may also be used to terminate the isocyanate-terminated prepolymer and/or in the same time to extend the isocyanate-terminated prepolymer, which results in a higher molecular weight. Nonlimiting example of hydroxyl-containing silanes include Bis(2-hydroxyethyl)-3-aminopropyltriethoxysilane ((HO—CH$_2$—CH$_2$)$_2$—N—CH$_2$—CH$_2$—CH$_2$—Si—(OC$_2$H$_5$)$_3$ CAS#7538-44-5) and a solvent-free version of 2,2-Bis(3-triethoxysilylpropoxymethyl)butanol (HO—CH$_2$—C—(CH$_2$—CH$_3$)—[(CH$_2$)$_3$—O—(CH$_2$)$_3$—Si—(OC$_2$H$_5$)$_3$]$_2$).

The aminosilane according to Chemical Formula 5a or Chemical Formula 5b has one hydrogen on the amine. Upon reaction with the polyurethane prepolymer, this singular hydrogen allows the creation of a linear system, substantially eliminating cross-linking and/or undesired by-product and/or premature cross-linking formation. Specifically, upon reaction with the polyurethane prepolymer, the silane group caps or terminates the polyurethane prepolymer by reacting with terminal —N=C=O groups of the polyurethane prepolymer. In one embodiment, the aminosilane may be bis-(gamma-Trimethoxysilylpropyl)amine, represented by Chemical Formula 6, or bis-(gamma-Triethoxysilylpropyl)amine:

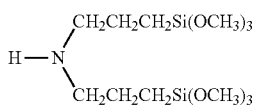

Chemical Formula 6

The ratio of polyurethane prepolymer to aminosilane may be between about 6 to about 12 weight percent based on 100 parts by weight of the polyurethane prepolymer. In one embodiment, the amount of aminosilane may be about 7 to 11 weight percent based on 100 parts by weight of the polyurethane prepolymer. In one embodiment, the amount of aminosilane may be about 8 to 10 weight percent based on 100 parts by weight of the polyurethane prepolymer.

According to some embodiments of the present invention, a method of making a primer solution includes mixing a polyol with a first solvent capable of activating or modifying a surface of a rigid polymeric substrate, and reacting an excess of an isocyanate and the polyol in the presence of the first solvent to prepare an isocyanate-terminated polyurethane prepolymer. The isocyanate-terminated polyurethane prepolymer can be reacted with an aminosilane to prepare an aminosilane-capped polyurethane prepolymer. The solution containing the aminosilane-capped polyurethane prepolymer and first solvent can be diluted with a second solvent to adjust the solids content of the resulting primer solution.

The reaction between the polyol and the isocyanate may take place in a reactor under a nitrogen atmosphere. The reactor may be equipped with an agitator to stir the contents of the reactor. The reactor may be equipped with a heater and/or cooler to heat and/or cool the contents of the reactor.

The reaction may take place in the presence of a first solvent or solvent combination. The first solvent should be capable of activating or modifying the rigid polymeric substrate to which the primer solution can be applied. In one embodiment, the first solvent includes butyl acetate. In one embodiment, the amount of first solvent added can be about 0.1 to about 2.5 by weight based on the total weight of the primer solution. In one embodiment, the amount of first solvent added can be about 1.2 to about 1.8 by weight based on the total weight of the primer solution.

The first solvent may be heated in the reactor to about 40 to 50° C. In one embodiment, the first solvent can be heated to about 40° C. In one embodiment, the polyol can be added to the first solvent after the first solvent has been heated to about 45° C.

In the case of a solid polyol, the polyol may be pre-heated in order to melt it before adding the polyol to the first solvent. In one embodiment, the polyol can be melted by pre-heating the polyol to about 60 to 70° C.

A catalyst may be added to the reaction mixture. In one embodiment, the catalyst includes a tin catalyst. Nonlimiting examples of tin catalysts include dibutyl tin diacetate, dibutyl tin dioctate, and dibutyl tin dilaurate. The catalyst may be added when the reaction mixture reaches a set or predetermined temperature. In one embodiment, the catalyst can be added when the reaction mixture reaches about 40° C.

The amount of aminosilane added to the isocyanate-terminated polyurethane prepolymer may be calculated based on the actual value of —N═C═O, which typically may be determined by back titration. In one embodiment, a stoichiometric amount of an aminosilane can be added based on the actual amount of —N═C═O. A slight overcharging and/or undercharging of aminosilane can be possible. In one embodiment, the overcharging or undercharging of aminosilane can be 1-2% by weight. The aminosilane reacts with the —N═C═O to cap the isocyanate-terminated polyurethane prepolymer. The end of reaction between the aminosilane and the isocyanate group may be determined and monitored by FT-IR analysis. The reaction is deemed complete when there is no —N═C═O peak visible in the IR spectrum When the reaction between the aminosilane and the polyurethane prepolymer is deemed complete, a second solvent or solvent combination can be added to the reaction batch to reduce the solids content from 43% to 26% and mixed to form a primer stock solution. In one embodiment, the second solvent comprises a high boiling point alcohol such as diacetone alcohol (DAA) The primer stock solution may then be removed from the nitrogen atmosphere and transferred to a designated holding container.

The primer stock solution may be further diluted with a third solvent or solvent combination and optionally a low molecular weight alcohol to form an applied primer solution. In one embodiment, the primer stock solution can be diluted to make an applied primer solution having a concentration of first solvent or solvent combination of about 0.1 to about 2.5% by weight of the total applied primer solution.

The following Examples are presented for illustrative purposes only, and do not limit the scope of the invention.

Example 1

Preparation of Primer Solution A 72.0 g butyl acetate was charged into a round bottom flask reactor equipped with an agitator and nitrogen inlet. The following reactions were performed in a nitrogen atmosphere. The butyl acetate was heated to about 40° C. 28.0 g polycarbonate diol (Poly CD-210, LONZA, formerly ARCH Chemicals) was pre-melted to about 60° C., and added to the butyl acetate. The solution was mixed for a few minutes until a homogenous solution was formed. If necessary, this solution can be packaged and stored for several months without any stability problems.

When the temperature of the solution reached about 40° C., 10.0 g isophorone diisocyanate and 0.0305 g of a 50% solution of dibutyl tin dilaurate ("DBTDL") catalyst in methyl ethyl ketone were added to the homogenous solution. The entire batch was agitated and heated to about 50° C. and held at that temperature for about 45 to 60 minutes. After about 45 to 60 minutes, agitation was stopped and the batch was allowed to cool to about 40° C. The amount of unreacted —N═C═O was determined by back titration. At this stage, the —N═C═O value should be lower than the theoretical or calculated —N═C═O value.

Based on the actual amount of —N═C═O value, a stoichiometric amount of bis-(gamma-Trimethoxysilylpropyl) amine was added slowly to the reaction solution. The batch temperature was maintained below between 40° C. and 45° C. during addition of the aminosilane. The stoichiometric amount of bis-(gamma-Trimethoxysilylpropyl)amine was 10.7 g. The reactor content was mixed for an additional 5 to 10 minutes to complete the reaction. The disappearance of —N═C═O was checked by FT-IR.

Once all of the —N═C═O had been reacted, 2.0 g methanol and 30.0 g diacetone alcohol were added under continuous agitation and mixed for about 5 to 8 minutes. An additional 30.0 g diacetone alcohol was added to create a primer stock solution. The primer stock solution was mixed for a few minutes and transferred to designated holding containers. At this point, the primer stock solution was stable and no longer required a nitrogen atmosphere.

A 1% applied primer solution A was prepared from the primer stock solution by mixing 2.0 g primer stock solution with 51.34 g diacetone alcohol. The final concentration of butyl acetate in the applied primer solution was about 1.48%.

Example 2

Preparation of Primer Solution B

A primer stock solution was prepared as in Example 1, and a 1% applied primer solution B was prepared from the primer stock solution by mixing 2.0 g primer stock solution with 2.0 g methanol and 49.34 g diacetone alcohol. The final concentration of butyl acetate in the applied primer solution was about 1.48%.

Comparative Example 1

Preparation of Comparative Primer Solution C 72.0 g butyl acetate was charged into a round bottom flask reactor equipped with an agitator and nitrogen inlet and was heated to about 40° C. 24.0 g polycarbonate diol (Poly CD-210, MW 2000, LONZA formerly ARCH Chemicals) was pre-melted in an oven for 24 hours at about 61° C., and added to the butyl acetate. The solution was mixed for about 30 minutes to form a homogeneous solution. When the homogeneous solution was about 40° C., 0.03 g of a 50% solution of dibutyl tin dilaurate ("DBTDL") catalyst in methyl ethyl ketone was added. Under agitation and nitrogen atmosphere, 6 g isocyanatopropyltriethoxysilane (CAS#24801-88-5) was added within one minute. No exotherm was observed during the addition. Every 20 minutes, a sample from the batch was checked by FT-IR to monitor the —N═C═O peak disappearance. Reaction was complete when no —N═C═O peak was visible in the IR spectrum after one hour and 20 minutes. Under agitation, 60 g of DAA and 2 g of methanol were added to form a Comparative primer stock solution C. The Comparative primer stock solution C was mixed for 10 minutes.

An applied Comparative primer solution C was prepared from the Comparative primer stock solution C by mixing 4 g primer stock solution with 2 g methanol and 67.17 g diacetone alcohol. The final concentration of butyl acetate in the applied primer solution was about 1%.

Table 1 shows the weight percent of butyl acetate, aminosilane-capped polyurethan prepolymer and DBTDL catalyst in the applied primer stock solutions A, B and C.

TABLE 1

| Reagent | Final amount of reagent in Primer Solution A (weight %) | Final amount of reagent in Primer Solution B (weight %) | Final amount of reagent in Primer Solution C (weight %) |
| --- | --- | --- | --- |
| Butyl Acetate | 1.48 | 1.48 | 1 |
| aminosilane-capped polyurethane prepolymer | 1 | 1 | |
| DBTDL catalyst | $6.25 \times 10^{-6}$ | $6.25 \times 10^{-6}$ | |

Comparative Example 2

Preparation of Comparative Primer Solution D

For purposes of comparison with certain embodiments of the present invention, a traditional primer was prepared by mixing vinyltrimethoxysilane (A-171, Momentive Performance Materials) with N-(2-aminoethyl)-3-aminopropyltrimethoxysilane (A-1120). Ethanol and deionized water were then added. This concentrated solution has a 24-hour shelf life and must be further processed within 24 hours.

Isopropyl alcohol was used to dilute the concentrated solution and the resulting stock solution was mixed for a few minutes. The stock solution has a shelf life of about one month when kept refrigerated.

A comparative primer solution D was prepared by diluting the stock solution with isopropyl alcohol and deionized water and mixing the applied primer solution for a few minutes at room temperature. The shelf life of the applied primer solution is about 6 months.

To test the adhesion of laminates created using the applied primer solution, 1" by 10" coupons were used in a standard 90° roller peel test. To form the laminated coupons, applied primer solution was applied to a 5" by 10" polycarbonate substrate and allowed to dry. A wire mesh was sandwiched between two thermoplastic urethane interlayers and then was positioned on top of the primed polycarbonate substrate to form a stack. The stack was laminated for 90 minutes at an elevated temperature and pressure. The laminated stack was cut into 1" by 10" coupons and tested. The results of the tests are shown in Table 2.

TABLE 2

| Lamination Temperature (° F) | Lamination Pressure (psi) | Comparative Primer Solution D (pli) | Primer Solution A (pli) | Comparative Primer Solution C (pli) |
| --- | --- | --- | --- | --- |
| 190 | 120 | 26 | 157 | |
| 220 | 120 | 60 | 208 | |
| 190 | 160 | 44 | 155 | |
| 220 | 160 | 56 | 214 | |
| 205 | 140 | 43 | 203 | |
| 194 | 150 | | | 36 |
| 194 | 150 | | | 56 |

A peel strength of greater than about 120 pli can be considered acceptable. As shown in Table 2, the laminates prepared with primer solution A exhibited peel strength far exceeding that of laminates prepared with the comparative primer solutions. Indeed, as can be seen in Table 2, the performance of primer solution A was essentially independent of the temperature and pressure of lamination. The adhesion between the thermoplastic interlayer and polycarbonate substrate was so strong that the upper interlayer and the wire mesh separated from the bottom interlayer, and a tab (used to initiate the peel test) on the bottom interlayer broke from the remainder of the bottom interlayer, which remained tightly adhered to the polycarbonate substrate for all of the laminates prepared with primer solution A.

Primer solution A was stored to check for stability and performance of the aged primer solution. After several months, the primer solution was stable, with no signs of viscosity increase or sediment formation. Test coupons prepared from a 4-month and 7-month old primer solutions, for example, exhibited substrate failure, which indicates a peel strength of greater than 200 pli.

Laminates were prepared using primer solution A and stored at room temperature for several months to check for performance of the aged laminate. Test coupons from the 1-month old to several-months old laminates also exhibited substrate failure, again indicating a peel strength of greater than 200 pli.

The present invention has been described with reference to exemplary embodiments and aspects, but is not limited thereto. Persons skilled in the art will appreciate that other modifications and applications can be made without meaningfully departing from the invention. For example, the primer solutions may be mixed by a simple mechanical mixing process, or by hand mixing. It is understood that other mixing processes may also be used to mix the reaction mixtures and solutions of the present invention. The specific compositions of the solvents may also be modified. In addition, although the primer solutions are described as being useful for aerospace applications, they may be useful for other applications as well. Accordingly, the foregoing description should not be read as limited to the precise embodiments and aspects described, but should be read consistent with and as support for the following claims, which are to have their fullest and fairest scope.

Throughout the text and claims, use of the word "about" in relation to a range of values is intended to modify both the high and low values recited, and reflects the penumbra of variation associated with measurement, significant figures, and interchangeability, all as understood by a person having ordinary skill in the art to which this invention pertains.

As used herein, unless otherwise expressly specified, all numbers such as those expressing values, ranges, amounts or percentages may be read as if prefaced by the word "about," even if the term does not expressly appear. Any numerical range recited herein is intended to include all sub-ranges subsumed therein. Plural encompasses singular and vice versa. For example, while the invention has been described in terms of "a" primer solution comprising a solvent and an aminosilane-capped polyurethane prepolymer, a mixture of solvents and/or prepolymers can be used. Also, as used herein, the term "polymer" is meant to refer to prepolymers, oligomers and both homopolymers and copolymers; the prefix "poly" refers to two or more. When ranges are given, any endpoints of those ranges and/or numbers within those ranges can be combined within the scope of the present invention. Including means "including but not limited to."

What is claimed is:

1. A primer solution for use on a rigid substrate, the primer solution comprising:
   a first solvent capable of reacting with or modifying a surface of the rigid substrate;
   a second solvent having a boiling point greater than 100° C., and
   an aminosilane-capped polyurethane prepolymer represented by Chemical Formula 1a or Chemical Formula 1b:

Chemical Formula 1a

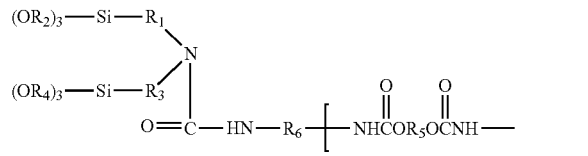

Chemical Formula 1b

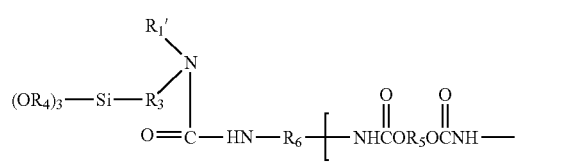

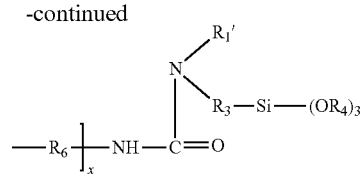

wherein each of $R_1$, $R_1'$, $R_2$, $R_3$ and $R_4$ comprises an aliphatic hydrocarbon, $R_5$ comprises a polyhydroxy linkage, $R_6$ comprises an aliphatic or cycloaliphatic hydrocarbon group, and x is an integer between 1 and 5.

2. The primer solution according to claim 1, wherein the second solvent comprises diacetone alcohol.

3. The primer solution according to claim 1, wherein the first solvent is present in an amount of 0.5% to 5% by weight based on the total weight of the primer solution.

4. The primer solution according to claim 1, wherein the first solvent is present in an amount of 1.2% to 1.8% by weight based on the total weight of the primer solution.

5. The primer solution according to claim 1, wherein the first solvent comprises butyl acetate.

6. The primer solution according to claim 1, further comprising a low molecular weight alcohol.

7. The primer solution according to claim 6, wherein the low molecular weight alcohol comprises methanol, ethanol and/or isopropyl alcohol.

8. The primer solution according to claim 1, wherein $R_6$ comprises an aliphatic hydrocarbon group.

9. The primer solution according to claim 8, wherein the aliphatic hydrocarbon group comprises isophorone.

10. The primer solution according to claim 1, wherein $R_5$ comprises a polycarbonate group.

11. The primer solution according to claim 1, wherein $R_1$ and $R_3$ each comprise a propyl group, and $R_2$ and $R_4$ each comprise a methyl group.

12. The primer solution according to claim 1, further comprising a catalyst.

13. The primer solution according to claim 12, wherein the catalyst comprises dibutyl tin diacetate, dibutyl tin dioctate and/or dibutyl tin dilaurate.

14. A method of preparing a primer solution for use on a rigid substrate, comprising:
   mixing a polyol represented by Chemical Formula 3 with a first solvent capable of activating or modifying a surface of the rigid substrate;
   reacting an isocyanate represented by Chemical Formula 4 and the polyol to produce a polyurethane prepolymer represented by Chemical Formula 2;
   reacting an aminosilane represented by Chemical Formula 5a or Chemical Formula 5b with the polyurethane prepolymer to produce an amino silane-capped polyurethane prepolymer represented by Chemical Formula 1a or Chemical Formula 1b; and
   adding a second solvent to the amino silane-capped polyurethane prepolymer, the second solvent having a boiling point of greater than 100° C., Chemical Formula 1a

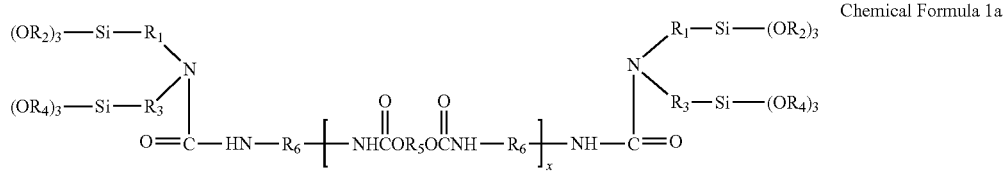

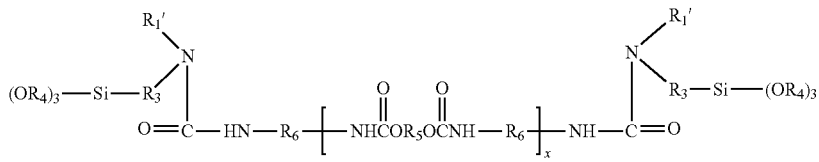
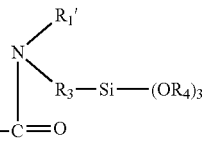

Chemical Formula 1b wherein each of $R_1$, $R_1'$ $R_2$, $R_3$ and $R_4$ comprises an aliphatic hydrocarbon, $R_5$ comprises a polyhydroxy linkage, $R_6$ comprises an aliphatic or cycloaliphatic hydrocarbon group, and x is an integer between 1 and 5;

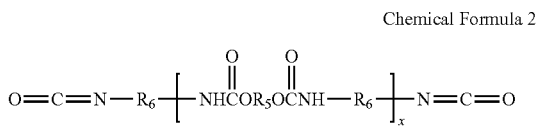

Chemical Formula 2 wherein $R_5$ comprises a polyhydroxy linkage, $R_6$ comprise an aliphatic or cycloaliphatic hydrocarbon group, and x is an integer between 1 and 5;

Chemical Formula 3 wherein $R_5$ comprises a polyhydroxy linkage, and a is 1 or 2;

Chemical Formula 4 wherein $R_6$ comprises an aliphatic or cycloaliphatic hydrocarbon, and b is 1 or 2

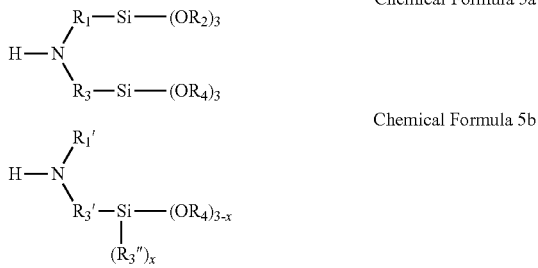

Chemical Formula 5a

Chemical Formula 5b wherein $R_1$, $R_1'$, $R_3$, $R_3'$ and $R_3''$ each comprise an aliphatic hydrocarbon, and $R_2$ and $R_4$ each comprise an aliphatic hydrocarbon.

15. The method according to claim 14, wherein the second solvent comprises diacetone alcohol.

16. The method according to claim 14, wherein the first solvent is added in an amount of 0.5% to 5% by weight based on the total weight of the primer solution.

17. The method according to claim 14, wherein the first solvent is added in an amount of 1.2% to 1.8% by weight based on the total weight of the primer solution.

18. The method according to claim 14, wherein the first solvent comprises butyl acetate.

19. The method according to claim 14, further comprising adding a low molecular weight alcohol to the aminosilane-capped polyurethane prepolymer.

20. The method according to claim 14, wherein the isocyanate comprises an aliphatic diisocyanate.

21. The method according to claim 20, wherein the aliphatic diisocyanate comprises isophorone diisocyanate ("IPDI").

22. The method according to claim 14, wherein the polyol comprises a polycarbonate diol.

23. The method according to claim 14, wherein the aminosilane comprises bis-(gamma-Trimethoxysilylpropyl) amine.

24. The method according to claim 14, wherein the reacting the isocyanate and the polyol further comprises adding a catalyst.

25. The method according to claim 24, wherein the catalyst comprises dibutyl tin diacetate, dibutyl tin dioctate and/or dibutyl tin dilaurate.

26. The method according to claim 14, further comprising melting the polyol before mixing the polyol with the first solvent.

27. An article, comprising:
a substrate; and
the primer solution according to claim 1 on at least a portion of the substrate.

28. The article according to claim 27, wherein the substrate is rigid.

29. The article according to claim 27, wherein the substrate is transparent.

30. The article according to claim 27, wherein the substrate comprises a polymer.

31. The article according to claim 27, wherein:
the substrate comprises a polymer;
the substrate is rigid; and
the substrate is transparent.

32. The article according to claim 27, wherein the substrate comprises at least one selected from the group consisting of a polycarbonate, glass, and an acrylic.

33. The article according to claim 27, wherein the substrate comprises polycarbonate.

34. A window, comprising the article according to claim 27.

35. The window according to claim 34, wherein the window is selected from the group consisting of a windshield and a canopy.

* * * * *